July 13, 1948.  D. GONDA  2,445,290
HOLLOW CAVITIED BODIES SUCH AS RIGID HOLLOW PANEL
STRUCTURES AND METHOD OF MAKING THE SAME
Original Filed Dec. 22, 1941  4 Sheets-Sheet 1
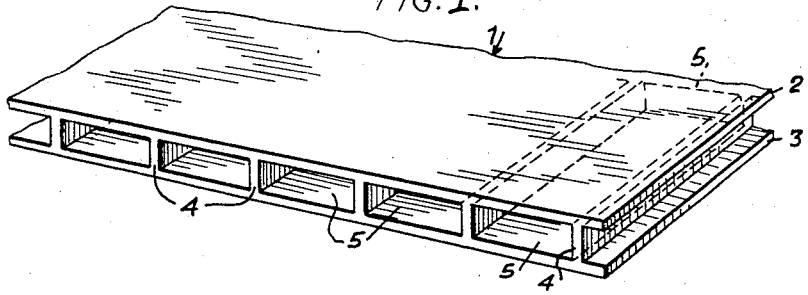
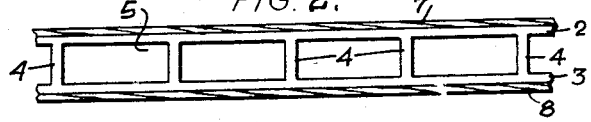
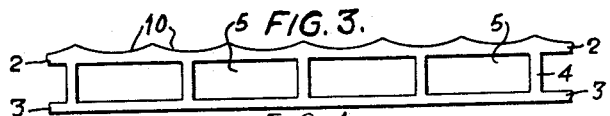
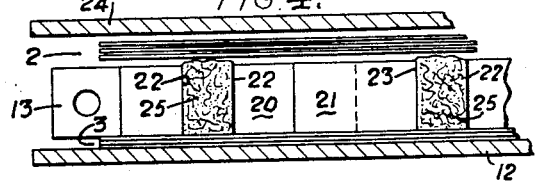
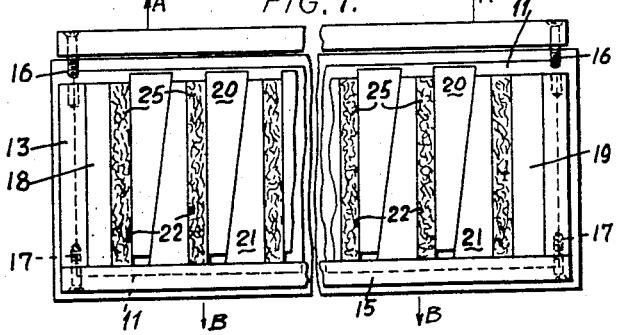
INVENTOR:
Desire' Gonda
BY
Toulmin + Toulmin
ATTORNEYS July 13, 1948.    D. GONDA    2,445,290
HOLLOW CAVITIED BODIES SUCH AS RIGID HOLLOW PANEL
STRUCTURES AND METHOD OF MAKING THE SAME
Original Filed Dec. 22, 1941    4 Sheets-Sheet 2
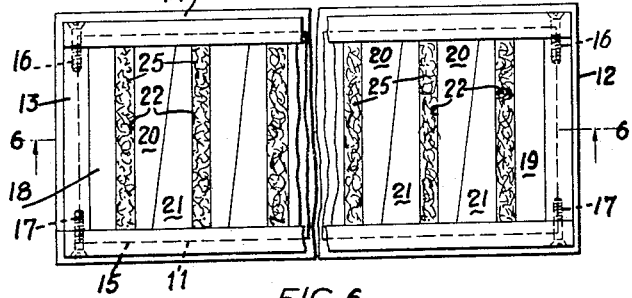
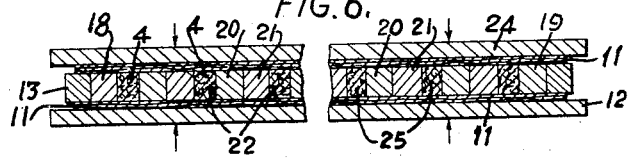
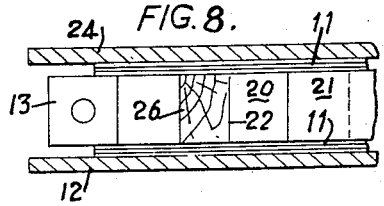
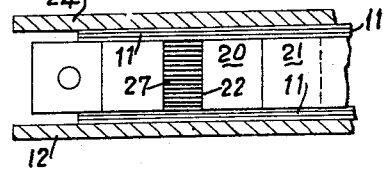
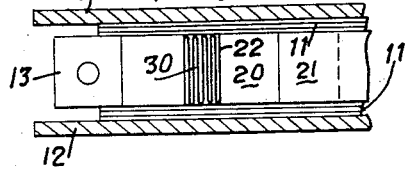
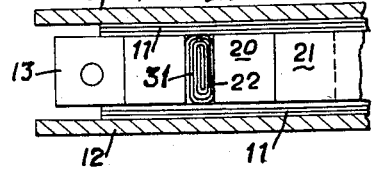
Desiré Gonda
Inventor
Toulmin & Toulmin
Attorneys

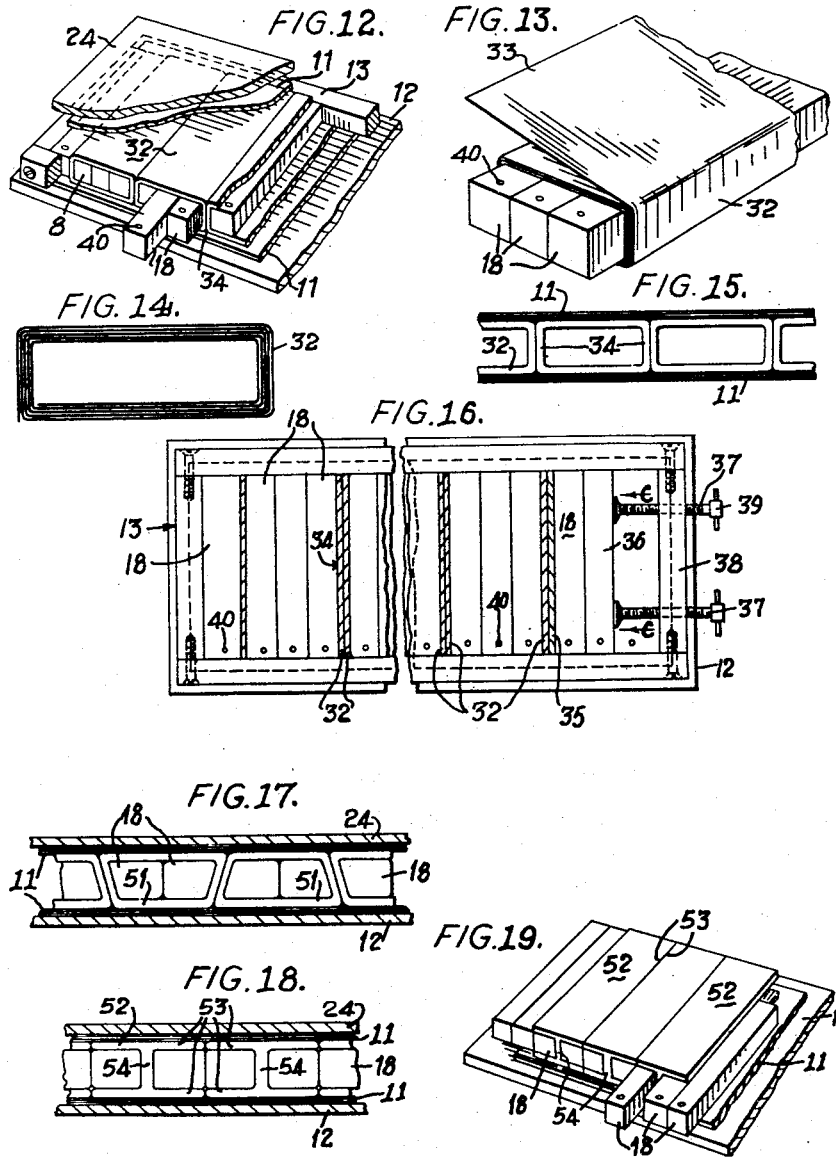

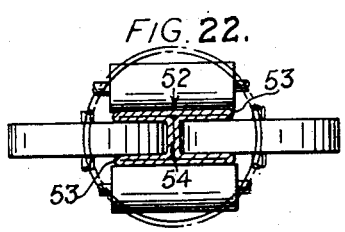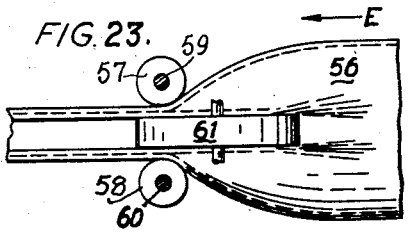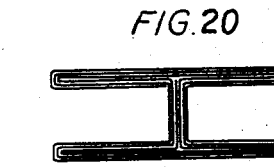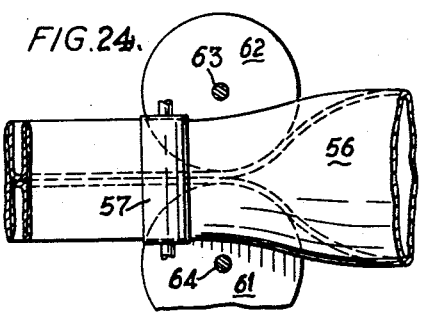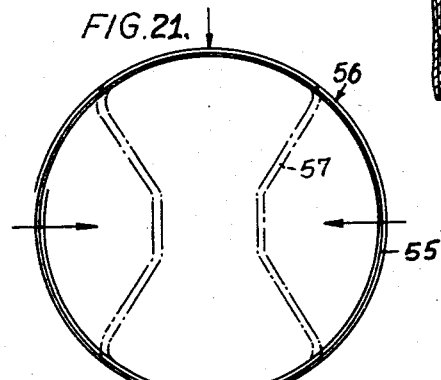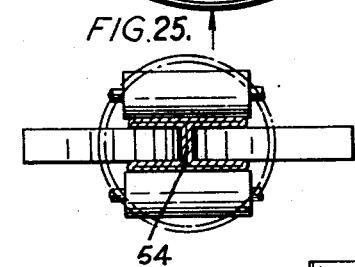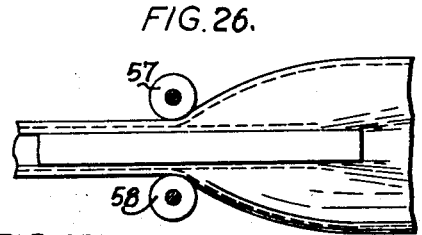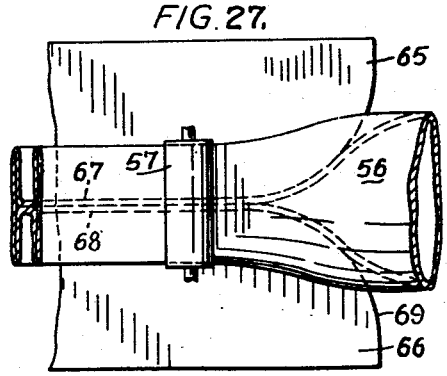

UNITED STATES PATENT OFFICE 2,445,290

HOLLOW CAVITIED BODIES SUCH AS RIGID HOLLOW PANEL STRUCTURES AND METHOD OF MAKING THE SAME

Desiré Gonda, London, England, assignor to Holoplast, Limited, New Hythe, near Maidstone, England, a British corporation Original application December 22, 1941, Serial No. 424,090. Divided and this application February 23, 1945, Serial No. 579,429

10 Claims. (Cl. 154—110)

This application is a division of my co-pending application Serial No. 424,090, filed December 22, 1941, now abandoned, and the invention covered herein relates to methods of producing rigid hollow panel structures. More particularly it relates to methods of manufacturing such structures from fibrous materials that contain or are impregnated with thermo-setting resins, such as phenol - formaldehyde, urea-formaldehyde or cresol-formaldehyde resins, the fibrous materials utilized preferably being in the form of laminae of fibrous sheets, such as paper. The structures produced consist of at least two sheets or sheet-like elements positioned one above the other in spaced relationship throughout their area, and joined together by web members that are positioned in spaced relationship to one another and extend transversely between the sheets. These panel structures (or hollow bodies as they are sometimes termed herein), when complete, after suitable heating and pressing operations, constitute integral reinforced units, homogeneous to the eye, the material being compressed and densified and all portions firmly bonded together. Such structures may be manufactured in large units, which have excellent mechanical and other useful properties, making them well adapted for various structural purposes.

Hollow bodies or panels as made according to the invention may find very extensive and varied employment in industry, but their suitability for use in the construction of bulkheads and linings in ships may be mentioned as one instance in which they may be employed with very considerable advantage. At the present time the bulkheads and linings employed extensively in the construction of ships are formed of plywood which is, among other things, combustible, water absorbent, liable to deterioration in damp or wet conditions, and to attack by insects, and are affected by acids. Hollow bodies according to this invention do not suffer from these disabilities; some of the advantages derived from using them in the construction of ships will therefore be obvious.

An additional object of the invention is the provision of an improved rigid hollow panel structure as hereinafter described.

An object of this invention is the provision of efficient and improved methods for the production of such panel structures, which may be used with advantage in place of present day materials in the construction of ships, buildings and other structures. Other objects comprise the provision of improved steps and combinations thereof which are particularly designed to make large scale manufacturing operations effective, and to ensure that the product shall have the mechanical properties required of it as a constructional unit.

In accordance with the invention, the spaced sheets of the structure, which are joined together by the webs, are formed of a plurality of laminae of fibrous sheet material which are bonded together by the thermo-setting resin contained therein, during the process. The webs also are preferably formed of laminated fibrous sheets, such as paper or fabric, containing the resin, and they preferably are of quadrilateral, e. g. rectangular tube construction or of girder construction to provide lateral flanges which become integrally united with the spaced sheets of the panel, when the resin has set.

In the process, the said spaced sheets are positioned on opposite sides of the web forming members, which are arranged to extend side by side across one dimension of the sheets with cavity-defining members, such as mandrels, therebetween, these mandrels being arranged to make close contact with all adjacent surfaces of the material which will be hardened to form the finished structure. The assembly is simultaneously subjected to heat and pressure, the pressure being applied in directions both parallel to the major surfaces or planes of the said sheets and transverse of the lengths of the transverse portions of the web members and also transversely of the major surfaces or planes of the said sheets. As a result, the resin is softened and caused to flow in and through all parts of the fibrous structure, the material is compressed and densified and, when the resin has set, all parts are simultaneously bonded together into an intergral rigid structure which is homogeneous in appearance, that is, to the unaided eye. Thereafter the mandrels are removed lengthwise.

In this process, certain practical difficulties have had to be overcome. The mandrels required must be able to withstand the pressure when the assembly is compressed, they must in most cases be good conductors of heat, and it must be possible to withdraw them lengthwise after the heating and pressing, so that they must have surfaces which are made as frictionless as possible, as by being smooth and polished. When heat is applied from the heated platens of the press, the mandrels should be heated to a temperature sufficiently high to prevent crystallization of the resin on the surfaces of the structure in contact with the mandrels which, as is well known, occurs when the resin sets against a cold surface. Also, the difference in temperature between the mandrels and the surrounding formed structure should be as small as possible, to reduce friction when the mandrels are withdrawn and the entire assembly, including the mandrels, should be such as to aid in the conduction of heat to all portions of the impregnated fibrous material, since all portions of the web members must be thoroughly cured. Therefore in practice metal mandrels are usually required, and the assembly for a panel unit of a size suitable for use in ship construction, for example, including the necessary number of mandrels, is very heavy.

When such an assembly, built upon bottom sheets of flexible material, such as paper, is to be transferred to the press the difficulty arises of maintaining all parts in their proper positions during the transfer. This may be accomplished by imparting rigidity to the assembly, by providing it with rigid heat-conducting top and bottom plates and preferably by clamping all of the web-forming members and mandrels together in a frame which has removable side portions and means, whereby also necessary pressure is applied transverse to the transversely-extending portions of the web members to compress and densify the same and to ensure the close contact between all parts of the same and the mandrels which aids in the most thorough conduction of heat to all parts. It should also be remarked that, the structure being hardened around the mandrels under considerable pressure, the problem of withdrawing them afterwards, in the case of large scale work, was believed to be one which would present great difficulty, but it was found that, with the methods and precautions indicated herein, they can be extracted from the opposite ends of the structure by suitable power without injury to the structure.

In the preferred method the web forming members are formed from unbroken continuous strip material rolled into a plurality of convolutions or folded upon itself to provide laminae which extend in continuous circuit without interruption throughout the strut and laterally extending portions of each member so that, the fibres extending in arch formation from the vertical into the horizontal portions of the member, the best conditions for obtaining strength at the junction of the upright or strut and laterally extending portions will be obtained.

In the appended drawings, a number of alternative forms of construction and methods for producing the same are illustrated, from all of which some of the advantages of the invention are obtained, preferred forms and methods, however, being as above indicated.

In the drawings:

Figure 1 is a perspective view of a portion of a typical hollow body or panel structure constructed in accordance with this invention.

Figure 2 is an end elevational view of a panel structure such as that shown in Figure 1, but which is provided with a facing material on its upper and lower surfaces.

Figure 3 is an end-elevational view of a combination of a hollow body or panel structure such as that shown in Figure 1 in which the top surface of the body is molded with an ornamental surface.

Figure 4 is a partial cross-sectional view illustrating diagrammatically apparatus employed in manufacturing one form of a panel structure in accordance with this invention.

Figure 5 is a plan view, with the top cover plate removed, of the apparatus illustrated in Figure 4.

Figure 6 is a cross-sectional view taken along line 6—6 of Figure 5.

Figure 7 is an elevational view similar to Figure 5 but illustrates the manner in which the apparatus is disassembled.

Figures 8, 9, 10 and 11 show diagrammatically various alternative methods for producing the webs of the hollow body.

Figure 12 is a fragmentary perspective view partially in elevation and partially in cross-section, illustrating a further modified method according to the invention of forming a rigid hollow body or panel structure.

Figure 13 is a perspective elevational view showing a method of making the tubular members shown in Figure 12.

Figure 14 is a cross-sectional view of a tubular member made according to the method illustrated in Figure 13.

Figure 15 is an end elevational view showing a panel structure constructed with tubular members.

Figure 16 is a plan view, with the top cover plate removed, of apparatus for producing a panel section from the assembly of materials illustrated in Figure 15.

Figure 17 is an end view of a panel structure similar to Figure 15 but showing the tubular members as having a trapezium shape.

Figure 18 is an end view, partially in cross-section, of a further modified arrangement of a panel structure constructed in accordance with this invention.

Figure 19 is a perspective fragmentary view illustrating an apparatus for constructing the hollow body shown in Figure 18.

Figure 20 is an end-elevational view of a web forming member shaped in the form of an I.

Figure 21 is an end-elevational view of a tubular member from which the web member shown in Figure 20, may be constructed.

Figure 22 shows diagrammatically a front elevational view of an apparatus for converting the tubular member shown in Figure 21 to the I-shaped member shown in Figure 20.

Figure 23 shows diagrammatically a slide-elevational view of the apparatus illustrated in Figure 22.

Figure 24 shows diagrammatically a plan view of the apparatus illustrated in Figures 22 and 23.

Figures 25, 26 and 27 show, respectively, a front elevational view, a side elevational view, and a plan view of a modified form of apparatus for converting the tubular member shown in Figure 21 into the I-shaped member shown in Figure 20.

Referring to the drawings, it will be seen that in Figure 1 there is shown a portion of a hollow body or reinforced panel structure, generally indicated by the reference numeral 1, that is constructed in accordance with this invention. The hollow body or panel structure comprises a top sheet 2 and a parallel bottom sheet 3 that is spaced from and is connected to the top sheet 2 by the webs 4 extending transversely between the sheets 2 and 3. The webs 4 are in spaced relationship to one another, and preferably extend all in one direction continuously throughout the width or the length of the sheets 2 and 3. Between the web 4 and the sheets 2 and 3, channels or passages 5 are provided which extend in parallel relationship from one side to the other of the hollow body.

It will be understood that the panel structure illustrated in Figure 1 can be used in various ways. As illustrated in Figure 2, the panel structure or hollow body can have a facing material secured to the exterior surfaces of the panels 2 and 3, or either of them. Also, the channels 5 can be filled with a heat insulating material to resist thermal conductivity through the panel structure. Again, as illustrated in Figure 3, the hollow body may have a decorative surface molded thereon, such as the flutes 10 that are molded in the panel 2.

One method of producing the hollow body or panel structure in accordance with this invention is illustrated in Figures 4, 5, 6 and 7.

The top and bottom sheets 2 and 3 of the hollow body are formed from a plurality of laminae 11 of fibrous sheets, e. g. paper, which have been treated or impregnated with an uncured thermo-setting resin, for example, phenol-formaldehyde, urea-formaldehyde or cresol-formaldehyde resin. The treatment may be effected in any convenient manner either during manufacture of the sheet material or subsequently to such manufacture, and the treatment may comprise complete impregnation of the fibrous sheet or merely the coating or spraying of the sheet with the resin in solution. The treated fibrous sheets are preferably dried before being used, this drying being carried out in any convenient manner as with the aid of drying ovens. Suitable paper, having the fibres thereof extending in all directions in the plane of the paper, makes a stronger final product, when all parts are bonded by the setting of the resin therein, than fibrous materials such as wood in which the fibres are all more or less parallel.

One group of fibrous sheets 11 is placed upon a lower flat metal cover plate or platen 12 and on top of the fibrous sheets 11 (which are of rectangular shape in plan) is mounted a rectangular metal frame 13 which is constructed so that one or more sides is or are removable. It will be seen, for example, by examining Figure 5, that either the side 14 or the side 15 can be removed by removing the screws 16 or 17 holding the parts of the frame together. The inside dimensions of the frame 13 when closed are rather less than the overall length and breadth of the group of fibrous sheets 11 on which the frame is placed. Within the frame 13, and on top of the group of fibrous sheets 11 on the plate 12, are arranged a number of removable cavity-defining members or mandrels formed as bars of metal of the same depth or thickness as the frame 13. In the example illustrated two cavity-defining members 18 and 19 of rectangular prism form, and a number of pairs of cavity-defining members 20 and 21 of wedge or tapered shape in plan are provided. These cavity-defining members are so disposed in the frame 13 as to leave, between adjacent pairs of the wedge-shaped ones, cavities 22 to receive the material from which the webs of the hollow body are to be formed. The end cavities 22 are defined on one side by one of the wedge-shaped cavity-defining members 20 or 21 and on the other side by one of the cavity-defining members 18 and 19.

It will be seen from Figure 5 in particular that the wedge-shaped cavity-defining members 20 and 21 are arranged in pairs with their tapered surfaces together so as to form, together, divisible cavity-defining members of rectangular prism form.

In the cavities 22, in accordance with the method illustrated in Figures 4 to 7, there is placed thermo-setting moulding material (e. g., in powder or tablet form) and the cavities are slightly over-filled as indicated at 23 (Figure 4). The next step in the manufacture of the hollow body is to place on top of the frame 13 fibrous sheets 11, similar in form and size to the treated sheets 11, similar in form and size to the group placed below the frame, although the number of fibrous sheets employed at the top need not necessarily be the same as the number of fibrous sheets 11 used at the bottom of the frame. Then on top of the upper fibrous sheets 11 is placed a top metal cover plate 24. The plates 12 and 24 are preferably rather greater in length and breadth than the frame 13. The whole assembly is now placed in a steam or electrically or otherwise suitably heated press, conveniently a hydraulic press, and subjected to heat and pressure of such a degree and for such a time as will insure the softening and flow of the thermo-setting resin of the assembly so as to insure the uniting of the various thermo-setting resin containing parts of the assembly, and then the setting and hardening of the thermo-setting resin with the consequent final uniting of the hitherto separate parts used in the manufacture. After the completion of the heating and pressing operation the parts will have, in transverse cross-section, the form approximately illustrated in Figure 6 of the drawings, and this assembly is taken from the pressing apparatus and when sufficiently cool the top plate 24 is removed, then the side 14 of the frame 13 is removed, after first releasing the screws 16, the side of the frame being drawn off in the direction of the arrows A shown in Figure 7. The other three sides of the frame 13 are then removed bodily in the direction of the arrows B, thus exposing the edges of the hollow body. The cavity-defining members 18, 19, 20 and 21 are then removed from the hollow body by moving them endwise. Figure 7 shows these members in the process of being removed. The tapered form of the cavity-defining members 20 and 21 assist the removal of these members from the hollow body.

The cavity-defining members 18, 19, 20 and 21 preferably have highly polished surfaces and similarly the inner surfaces of the plates 12 and 24 may also be highly polished, although where it is required to give one or both of the sheets 2 and 3 of the hollow body a matt or other non-polished-plain surface, then the corresponding cover plate 12 or 24 would have an appropriately formed surface instead of a highly polished one.

The said frame 13 and cavity-defining elements 18, 19, 20 and 21 may, and preferably are, preheated before being assembled as above described, and these parts are preferably accurately made so as to insure full contact of the various parts with the adjacent surfaces of the materials being formed into the hollow body. Good contact is desirable since this insures the necessary internal support of the materials and avoids their deformation when pressure is applied to the assembly and, moreover, insures that the necessary heat will be transmitted to the inner surfaces of the materials thus thoroughly effecting the required initial softening and then the setting and hardening of the thermo-setting resin thereof.

Figures 8, 9, 10 and 11 illustrate various methods of producing the webs between the panels of the hollow body, and except for this difference, the process of producing the hollow bodies is the same as that heretofore described.

In Figure 8 there is illustrated the use of a wood member 26 as the web member, this member having been treated with a heat-hardening phenolic condensation product, or other thermo-setting resin.

In Figures 9, 10 and 11, the webs 27, 30 and 31, respectively, are illustrated as being formed of a plurality of layers of fibrous material disposed in juxtaposed relationship for filling the cavity between the members 20 and 21, and thus form the web from sheets of fibrous material that contain a thermo-setting resin.

In Figures 12 to 16 inclusive there is illustrated an alternative method of producing a panel structure in accordance with this invention. In carrying out this method, a plurality of individual tubular channel defining web forming members 32 are formed from fibrous sheet or strip material treated or impregnated with an uncured thermo-setting resin. As illustrated, the tubular members 32 are of rectangular shape in cross-section and are conveniently formed by taking a sheet of paper impregnated with an uncured thermo-setting resin, that is previously dried in the paper, and wrapping the sheet a number of times around any appropriate form, such as the internal supporting members or mandrels 18, to form a plurality of superposed plies.

The tubular members 32 and the form members 18 are placed side by side in a metal frame 13, similar to that previously described, so that the vertical longitudinal walls of adjacent tubular members 32 abut as shown, for example, at 34 in Figures 15 and 16. If it is desired to obtain a double thickness of fibrous material at the end of the structure, such as on the right-hand end thereof, a separate strip of fibrous material 35 may be used, as shown in Figure 16.

Between the ends of the frame 13 and the nearest wall of the nearest tubular member 32 one or more additional internal supporting means or cavity-defining members 18 may be disposed so as to fill the frame, or, in order that side pressure may be applied to the cavity-defining members and the material therebetween in a direction parallel to the plane of the frame 13 and transverse to the length of the cavity-defining members 18, the frame may be provided with side pressure exerting devices. Such devices may be of various forms and apparatus fitted with such pressure devices may be employed in any of the methods of carrying this invention into practice herein described. The means for exerting the said side pressure illustrated in Figure 16 comprises a pressure bar 36 similar in all respects to a cavity-defining member 18, which is adapted to be moved laterally in the direction of the arrows C by means of rotatable spaced screws 37 mounted in the end member 38 of the frame 13, the screws 37 being provided with handles 39 or any other suitable means whereby they may be rotated.

Before assembling the tubular members 32 in the frame 13 as above explained, fibrous sheets 11 (to form the bottom sheet 3 of the hollow body) are first arranged upon the bottom cover plate 12, and then the frame 13 is arranged upon the fibrous sheets 11. Now the frame is filled with tubular members 32 and the internal supporting means or cavity-defining members 18. Next the top treated fibrous sheets 11 are placed upon the frame 13, the top cover plate 24 is placed in position on the other assembled parts, and the whole assembly is finally placed in the press and subjected to heat and pressure as described in connection with the method illustrated in Figures 4 to 7. The frame 13 is, of course, divisible to enable the various parts to be removed therefrom after the hardening or curing process has been completed, and to facilitate the removal of the cavity-defining members 18 after they have been partially projected from the hollow body. These cavity-defining members may be provided with holes, such as 40, into which a tool may be hooked. This removal of the cavity-defining members may in large scale operations be performed automatically by appropriate hydraulic or other machinery.

It will be readily appreciated that other means of producing the pressure by movement of member 36 can be used, such as suitable wedge-shaped members that may be positioned between the member 36 and the end wall 38 of the frame. Also, it will be understood that instead of using tubular members of a rectangular shape, as heretofore described, the tubular members may have any other siutable shape desired, such as the trapezium shape of the tubular members 51 illustrated in Figure 17.

Experiments have shown that very good results can be obtained when making hollow bodies according to the invention by any of the methods already described above, but it is noted that better physical properties are obtained when employing for forming the webs 4, tubular bodies such as the bodies 32 and 51, for example, above described, or when using web forming bodies of girder cross-section such as will be subsequently described herein. The improved results arise from the fact that when tubular bodies such as 32 or 51 or girder section members as will subsequently be described are employed the top and bottom walls of the tubular members or the top and bottom flanges of the girder-like members form an integral part of the top and bottom sheets 2 of the ultimate hollow body 1.

In Figures 18 and 19 there is illustrated a method of forming a hollow body according to this invention by the use of web forming members 52 that have an I or double-T shape in cross-section, these members being prefabricated from fibrous sheet material treated with the required thermo-setting resin. The method of making the hollow body by the assembly of the I-shaped members with sheets on opposite sides thereof, as illustrated in Figure 18, is the same as that which has been heretofore described, it being understood, of course, that when heat and pressure is applied to the assembly illustrated in Figure 18, the sheets 11, the web portions 54 and the lateral extending portions 53 of the web portions 54 are bonded into a homogeneous structure wherein the sheets 11 become integral with the lateral portions 53 of the webs 54 while the abutting surfaces or lateral bonding surfaces of the portions 53 become integral with each other. The heat-and-pressure treatment causes a flow of the thermo-setting resin contained in the various members of the assembled parts so that there is an inter-flow of resin between these members which insures a close bonding of the members.

One method of producing the web-forming members having the I or double-T shape in cross-section is illustrated in Figures 21 to 24.

According to this method a sheet or strip 55 of fibrous material of the required dimensions is rolled to constitute a tubular member 56 as seen in end elevation in Figure 21. The rolling is continued until the wall of the tubular member is of the requisite thickness and has the required number of plies. After this tubular member has been made it is deformed from a circular cross-section to the I or double-T cross-section shown in Figure 20, the chain dotted lines 57 in Figure 21 illustrating an intermediate stage in the process of converting the tubular member into the member shown in end view in Figure 20.

As will be seen from Figure 22, each of the flanges 53 of the girder-like member 52, and the web 54, is made up of a plurality of plies or layers of the fibrous sheet which was used to form the tubular member illustrated in Figure 21 and furthermore, the plies of the various parts, i. e. flanges and the web, of the girder-like member 52 are integrally united, all being formed from the same original sheet or strip of fibrous material which at no stage in the prefabrication of the girder-like member 52 is severed at any part.

The fibrous sheet material from which the girder-like members 52 are formed may be treated with a thermo-setting resin material before it is rolled into the form shown in Figure 21 or at any other stage in the formation of the prefabricated girder-like web forming members 52, or these members may be treated with a thermo-setting resin subsequently to being formed.

The tubular member 56 is fed in the direction of the arrow E (Figure 23) between a pair of horizontal pressure rollers 57 and 58 arranged on horizontal axles 59 and 60 disposed directly one above the other and parallel to one another, the distance between the nearest parts of the peripheries of the rollers 57 and 58 being equal to the overall height of the finished girder-shaped web forming element 52. The rollers 57 and 58 thus flatten the tubular member 56 as is clearly illustrated in Figure 23, whilst further pressure rollers 61 and 62 which the tubular member 56 first reaches, and which rotate about parallel vertical axes 63 and 64, are arranged to bear at their peripheries on the sides of the tubular member 56 and press these sides inwardly so as to bring central portions thereof, and equal in depth to the inside depth of the web 54 of the pre-fabricated web forming member 52 shown in Figure 22, together along a central longitudinal medial plane. Thus the tube 56 passes into the apparatus, ratus in tubular form and leaves the apparatus, on the opposite side of the rollers 57 and 58 to that at which it entered the apparatus, in I-shaped girder form.

A modification of the apparatus shown in Figures 22 to 24 inclusive is illustrated in Figures 25 to 27 wherein the rollers 61 and 62 are replaced with stationary plates 65 and 66 disposed in a common horizontal plane for forcing the tubular member laterally inwardly. The plates 65 and 66 are arranged to provide a flared mouth 69 into which the tube 56 is directed. The webs of the hollow body, especially in a hollow body of rectangular shape in plan, preferably, extend in parallelism from one end of the body to the other end and are continuous. Thus the hollow body has parallel open ended channels or cavities extending from end to end thereof, and these channels or cavities may, if desired, be used for housing electric wiring and/or for the air ducts of a ventilating system, or for receiving heat and/or sound insulating material. Naturally a hollow body of this kind, in which the webs run in one direction only, presents higher resistance to bending or deflection in the longitudinal planes containing the webs than it does in a plane at right angles to the lengths of the webs. Therefore, in using such a hollow body in building a structure, the body would preferably be so disposed that the webs ran in the direction in which the greater resistance to bending or deflection is required.

It will, of course, be understood that the hollow bodies may be produced in shapes other than rectangular in plan if desired. For instance, the bodies may be of tapered or truncated sector-like shape in plan and in such a case the webs would preferably converge to the narrower end of the body instead of being parallel to one another.

If desired, the hollow body may be provided on one or both sides with a facing material of a kind different to the body itself. Such a facing may be provided, for example, for decorative or utilitarian purposes. The facing may for example be a wood veneer, e. g. deal, oak, mahogany or walnut; or it may be a decorative fabric or paper. These specific facing materials are, however, merely mentioned by way of example since almost any fibrous material may be used for the purpose.

The facing material is preferably united to the hollow body by thermo-setting resin simultaneously with the formation of the hollow body itself, and where a relatively hard and wear-resisting surface is required on the facing material it is arranged, in manufacture, that the thermo-setting resin should permeate the whole of the facing material, but where it is desired that the outer surface of the facing material shall retain its normal characteristics (e. g. in the case of a wood facing, where it is desired that the facing should be capable of being glued to another wood surface) then it is arranged that the thermo-setting resin shall not permeate to the outer surface of the facing material.

The treatment of the fibrous material with the thermo-setting resin may be carried out in any convenient manner, for example by dipping the material in resin in solution, e. g. the resin in alcohol in the case of a spirit-soluble resin or in what is known as a "water-solution" of the resin if the resin is what is known as a "water-soluble" thermo-setting resin. The dipping may be effected by a continuous or intermittent process. The continuous process would be convenient where the fibrous material to be treated was fed from a roll or similar source whilst the intermittent process would be more convenient where the fibrous material was already cut to size in strips or sheets. Instead of impregnating the fibrous material by dipping it in a resin solution, such a solution may be sprayed, painted, or otherwise applied as a coating to the fibrous material either on one side only or on both sides as required. Where the fibrous material to be treated is, for example, in the form of wood veneers or fibrous sheets which are relatively thick, or where the fibrous material is not very absorbent, or in any other circumstances where it would be advantageous, the treatment of the fibrous material with the thermo-setting resin may be carried out in vacuum.

While the method of manufacture, as well as the article disclosed and described herein illustrate a preferred form of the invention, yet they are subject to alterations without departing from the spirit of the invention, and all modifications that fall within the scope of the appended claims are intended to be included herein.

Having thus fully described my invention, what I claim as new and desire to secure by Letters Patent is:

1. A method of producing a rigid hollow panel structure which includes the steps of (a) winding continuous lengths of uncured thermo-setting resin impregnated fibrous strip or sheet material into a plurality of convolutions to make a plurality of individual channel defining multi-ply web forming members; (b) placing said individual web forming members side by side between substantially parallel groups of superposed uncured thermo-setting resin impregnated fibrous sheets or laminae so that said web forming members are substantially parallel to one another and have web portions extending transversely of the major surfaces of said groups of sheets or laminae at spaced intervals across the widths of said groups of sheets or laminae; (c) temporarily supporting said web forming members internally by supporting means conforming to the shape of the channels defined by the said web forming members; (d) temporarily applying confining means solely to said web forming members and their supporting means to hold them in their assembled positions between the said parallel groups of sheets or laminae; (e) subjecting all of the said plurality of spaced multi-ply web portions to pressure exerted transversely of the lengths of such web portions and substantially parallel to the said major surfaces of the said parallel groups of sheets or laminae and also exerting pressure on the assembly, produced as specified, transversely of said major surfaces of the said parallel groups of resin impregnated sheets or laminae; (f) and, while maintaining pressure on said assembly, applying heat thereto for a predetermined time so as to compress and densify all fibrous portions of the assembly inclusive of the said web portions and to bond and harden all such portions into an integral rigid structure; (g) relieving the pressure on said assembly; (h) and removing the said confining means and internal supporting means from the panel so produced.

2. A method of producing a hollow panel structure which includes the steps of (a) winding continuous lengths of uncured thermo-setting resin impregnated paper strip or sheet into a plurality of convolutions to make a plurality of individual multi-ply web forming members of quadrilateral cross section; (b) placing said individual web forming members in side by side contact between substantially parallel groups of superposed thermo-setting resin impregnated paper sheets or laminae so that said web forming members are substantially parallel to one another and have web portions extending transversely of the major surfaces of said groups of sheets or laminae at spaced intervals across the widths of said groups of sheets or laminae; (c) temporarily supporting said web forming members internally by split metal mandrels conforming to the shape of the channels defined by the said web forming members; (d) temporarily holding said web forming members and said mandrels together so as to prevent relative separation of said web forming members; (e) subjecting all of the said plurality of spaced multi-ply web portions simultaneously to pressure exerted transversely of the lengths of such web portions and substantially parallel to the said major surfaces of the said parallel groups of sheets or laminae and also exerting pressure transversely of the planes of the said parallel groups of resin impregnated sheets or laminae; (f) and applying heat to the said assembly for a predetermined time so as to compress and densify all fibrous portions of the assembly and to bond and harden all such portions into an integral rigid structure which is homogeneous to the eye; (g) relieving the pressure on said assembly; (h) and removing the mandrels from the panel so produced.

3. A method of producing a hollow panel structure which comprises, positioning top and bottom sheets in parallel relation upon opposite sides of a plurality of individual web-forming members, said top and bottom sheets comprising a plurality of superposed fibrous sheets in each instance and said web-forming members also comprising a plurality of plies of fibrous material, all of said sheets and plies containing a thermo-setting resin, said web-forming members having portions extending in planes substantially at right angles to said top and bottom sheets and portions extending laterally from and for the full lengths of the tops and bottoms of said transverse portions and lying closely against the inner surfaces of said top and bottom sheets, the plies of said web-forming members extending continuously from the transverse portions thereof into the laterally-extending portions thereof, said web-forming members extending side-by-side from end to end of the structure with the lateral bounding surfaces of the laterally-extending portions of all the web-forming members closely adjacent to the similar lateral bounding surfaces of the laterally-extending portions of the adjacent web-forming members across the width of the structure, positioning internal supporting means in the passages bounded by the transverse and laterally-extending portions of said web-forming members, retaining the said web forming members and their supporting means against separation from their said positions, applying and maintaining pressure on said web-forming members and interposed supporting means in a direction which is substantially parallel to the planes of the said top and bottom sheets and transverse to the lengths of the transverse portions of said web-forming members to compress the plies of the said transverse portions tightly together, and applying pressure to the assembly in a direction transverse to the planes of the said top and bottom sheets with the application of heat to the assembly, said heat and pressure being sufficient to soften and cause said resin to flow throughout all resin-impregnated fibrous portions of the assembly, to compress and densify all of said fibrous portions and to harden the resin, simultaneously bonding all of said portions of the assembly together into an integral rigid structure which is homogeneous to the eye.

4. A method of producing a hollow panel unit which comprises positioning flexible fibrous laminated bottom sheet material containing a thermo-setting resin upon a supporting plate, placing thereon a frame having removable side portions, positioning in said frame a plurality of web-forming members each comprising portions extending transversely to said bottom sheet material and portions extending laterally from the tops and bottoms of the said transverse portions, said bottom lateral portions resting on the top surface of said bottom sheet material, said web-forming members being formed of flexible laminated fibrous material containing thermo-setting resin and extending side by side from end to end of said bottom sheet material with the lateral bounding surfaces of the laterally-extending portions of all the web members closely adjacent to the lateral bounding surfaces of the corresponding laterally-extending portions of the adjacent web-forming members across the width of the bottom sheet material so as to define a plurality of passages between said members, positioning smooth surfaced mandrels in the said passages to support all the adjacent transverse and laterally-extending web-forming member and laterally-extending web-forming member surfaces, placing flexible laminated fibrous top sheet material containing thermo-setting resin upon said frame with the bottom surface thereof resting upon the upper laterally-extending portions of said web-forming members, placing a cover plate thereon, applying and maintaining pressure on said web-forming members and mandrels in said frame in a direction which is substantially parallel to the planes of the said bottom sheet material and is transverse to the lengths of the said transverse portions of said web-forming members, to compress the plies of the said transverse web portions tightly together, subjecting the said assembly to pressure transverse to said laminated top and bottom sheet material and applying heat to the whole assembly to soften and then to cause the said resin to flow under said pressure through all of the fibrous parts of the assembly and thereby to compress and densify all of the same and simultaneously to bond and harden all parts thereof when the resin sets, into an integral structure which is homogeneous to the eye, releasing the transverse pressure upon the mandrels and transverse web portions of the structure, thereafter opening said frame, and withdrawing the mandrels lengthwise.

5. A method of producing a hollow panel structure which comprises, positioning flexible fibrous laminated top and bottom sheets in parallel relation upon opposite sides of channel defining laminated web-forming members, the formation of each of said web-forming members including the coiling of fibrous strip material to produce plies which extend continuously throughout the member, all of said sheets and plies containing a thermo-setting resin, said web members having strut portions extending in planes at right angles to said top and bottom sheets and portions extending laterally from the tops and bottoms of said strut portions and lying against the inner surfaces of said top and bottom sheets, said web-forming members being arranged so as to extend side-by-side from end to end of the structure with the lateral bounding surfaces of the laterally-extending portions of all the web-forming members closely adjacent to the lateral bounding surfaces of the laterally-extending portions of the adjacent web-forming members across the width of the structure, positioning mandrels in the passages bounded by said web-forming members with a close fit therein, holding the said web-forming members in the said arrangement, applying and maintaining pressure on the said web-forming members and mandrels in a direction transverse to the lengths of the said strut portions of said web-forming members and substantially parallel to the planes of top and bottom sheets of the assembly, and applying pressure to the assembly in a direction transverse to the planes of the said top and bottom sheets with simultaneous application of heat to the assembly, said heat and pressure being sufficient to soften and cause said resin to flow throughout all fibrous parts of the assembly, to compress and densify all fibrous portions of the latter and to bond and harden all portions thereof into an integral rigid structure which is homogeneous to the eye, relieving the said top and bottom and side pressures, and withdrawing the said mandrels from the panel structure produced.

6. A method of producing a rigid unitary hollow panel structure which comprises assembling a lower group of superposed fibrous sheets impregnated with uncured thermo-setting synthetic resin, forming a plurality of individual tubular multi-ply web-forming members of quadrilateral cross-sectional form from fibrous uncured thermo-setting synthetic resin-impregnated flexible material wound into tubular form and enclosing and filled by internal supporting means, placing and retaining a plurality of the said individual tubular web-forming members in parallel side-by-side contacting relationship upon said group of lower sheets, assembling an upper group of superposed fibrous sheets impregnated with the said uncured thermo-setting synthetic resin and placing this group of sheets upon the upper sides of the web-forming members already placed upon the said lower group of sheets, applying heat and pressure to the said assembly of material to consolidate them and to cause the flow of the said resin throughout all fibrous parts of the assembly and the hardening of the resin with the uniting integrally together of all of the said fibrous-resin-impregnated materials into a unitary whole, said pressure being applied to the said assembled materials in a direction substantially normal to the major planes of said upper and lower groups of sheets and also in a direction transverse to the lengths of the said web-forming members and substantially parallel to the said major planes, relieving the cured structure of pressure, and removing said internal supporting means from between the webs and the top and bottom sheets of the panel.

7. A method of producing a rigid unitary hollow panel structure which comprises assembling a lower group of superposed fibrous sheets impregnated with uncured thermo-setting synthetic resin, forming a plurality of individual tubular multi-ply web-forming members of quadrilateral cross-sectional form from fibrous uncured thermo-setting synthetic resin-impregnated flexible strip material wound into tubular form, placing a plurality of said individual web-forming members in parallel side-by-side contacting relationship upon said group of lower sheets and with rigid heat-conducting mandrels within said members, assembling a second group of superposed fibrous sheets impregnated with uncured thermo-setting synthetic resin and placing the same upon the upper sides of the said web-forming members which are upon said lower group of sheets, applying side pressure on the said web-forming members and enclosed mandrels in a direction transverse to the lengths of the said mandrels to compress tightly together the portions of the plies of the web-forming members that are between the mandrels, and applying top and bottom pressure to the assembled parts in a direction transverse to the planes of said groups of sheets, applying heat to the assembly, said heat and pressure being sufficient to soften and cause said resin to flow throughout all fibrous parts of the assembly, to compress and densify all such parts and to harden and set the resin with the consequent bonding of all of the said fibrous parts into a rigid integral structure, releasing the said pressures and drawing the mandrels endwise from the structure.

8. A method of producing a rigid hollow panel unit which comprises assembling a lower group of superposed fibrous sheets impregnated with uncured thermo-setting synthetic resin, forming a plurality of multi-ply web-forming members of substantially I-shaped cross-sectional form by winding uncured fibrous thermo-setting-synthetic-resin-impregnated-flexible material into members of tubular form and then deforming said tubular members to an I-shaped cross-sectional form, placing a plurality of said I-shaped web-forming members in parallel side-by-side relationship upon said group of lower sheets with the longitudinal edges of the laterally extending flanges of each web-forming members engaging the corresponding edges of the flanges of the next web-forming member or members, filling the passages defined by web-forming members with supporting means for supporting the assembled fibrous-resin materials during a subsequent pressing operation, assembling an upper group of superposed fibrous sheets impregnated with the said uncured thermo-setting resin and placing this group of sheets upon the upper flanges of the web-forming members already placed upon the said lower group of sheets, applying side pressure to said web-forming members and the supporting means therebetween in a direction transverse to the lengths of the said web members and substantially parallel to the major planes of the said upper and lower groups of sheets, applying pressure to the said assembly of materials in a direction substantially perpendicular to the said planes of said groups of sheets and applying heat to the assembly, all to consolidate the fibrous materials thereof and to cause the flow of the said resin and the hardening of the latter with the uniting integrally together of all of the said fibrous-resin-impregnated materials into a unitary whole, then relieving the cured structure of pressure, and removing said internal supporting means from between the webs and the top and bottom sheets of the panel.

9. A method of producing a rigid hollow panel structure which comprises, assembling a plurality of superposed flexible sheets of paper impregnated with uncured thermo-setting synthetic resin; forming a plurality of multi-ply web-forming members each of which has strut-forming portions and lateral extensions at right angles from the tops and bottoms thereof, each of said members being formed from flexible paper strip of the same character as that of said superposed sheets and impregnated with like thermo-setting resin, the strip material of each of said web-forming members being wound into a plurality of convolutions and arranged to produce plies which extend in a continuous circuit throughout the member, placing a plurality of said web-forming members in parallel side-by-side relationship upon said superposed sheets with the strut-forming portions thereof normal to such sheets and with the lower extensions of the web-forming members lying closely upon the uppermost of said sheets and having their longitudinally-extending lateral bounding surfaces engaging with the corresponding surfaces of the adjacent members, inserting internal supporting means in the passages formed between said strut-forming portions and lateral extensions of the web-forming members so as to fill the said passages, retaining the said web-forming members and their internal supporting means in their said side-by-side positions on the said superposed sheets, assembling a second group of superposed fibrous sheets of like character to said first named sheets and similarly impregnated, positioning this second group of sheets upon the upper extensions of the strut-forming portions of the said web-forming members, applying and maintaining side pressure on the said strut-forming portions and said internal supporting means in a direction transverse to the lengths of said strut-forming portions and substantially parallel to said top and bottom sheets to compress said strut-forming portions between said internal supporting means, and applying heat to the assembly and simultaneously applying top and bottom pressure to the same in a direction normal to said first mentioned direction, said heating and pressing operations being adapted to consolidate the resin-impregnated fibrous materials and to cause the flow of the resin through all the said fibrous parts, with the subsequent hardening of the resin bonding all portions of the fibrous assembly into a rigid integral structure, and thereafter releasing the said pressures and removing the said internal supporting means from the structure.

10. A panel structure comprising in combination, a plurality of spaced fibrous laminated sheets arranged substantially parallel to each other, each sheet being impregnated with thermo-setting resin, a plurality of spaced and substantially parallel webs of fibrous material impregnated with thermo-setting resin and interposed between said sheets so as to extend substantially transverse to the major surfaces of said sheets, each of said webs forming a portion of a laminated channel defining member composed of fibrous sheet material wound into a plurality of convolutions and bonded to said laminated sheets by the thermo-setting resin in said laminated sheets and in said channel defining members, with the laminae in said webs arranged at an angle to the laminae of said laminated sheets, said laminated sheets and said webs being compressed in the directions of their thicknesses so that said webs form with said laminated sheets a rigid integral densified structural unit.

DESIRÉ GONDA.

REFERENCES CITED

The following references are of record in the file of this patent:

UNITED STATES PATENTS

| Number | Name | Date |
|---|---|---|
| 516,572 | Mowry | Mar. 13, 1894 |
| 1,195,949 | Carney | Aug. 22, 1916 |
| 1,284,363 | Kempton | Nov. 12, 1918 |
| 1,314,627 | Willard | Sept. 12, 1919 |
| 1,469,220 | Kemp | Oct. 2, 1923 |
| 1,473,842 | Frederick | Nov. 13, 1923 |
| 1,685,244 | Rosenzweig | Sept. 25, 1928 |
| 1,867,575 | Loetscher | July 19, 1932 |
| 2,029,048 | Atwood | Jan. 28, 1936 |
| 2,300,760 | Amigo | Nov. 3, 1942 |

FOREIGN PATENTS

| Number | Country | Date |
|---|---|---|
| 450,524 | Great Britain | Apr. 23, 1935 |